Frees & King.
Truss Bridge.
No. 2,707. Reissued Jul. 30, 1867.
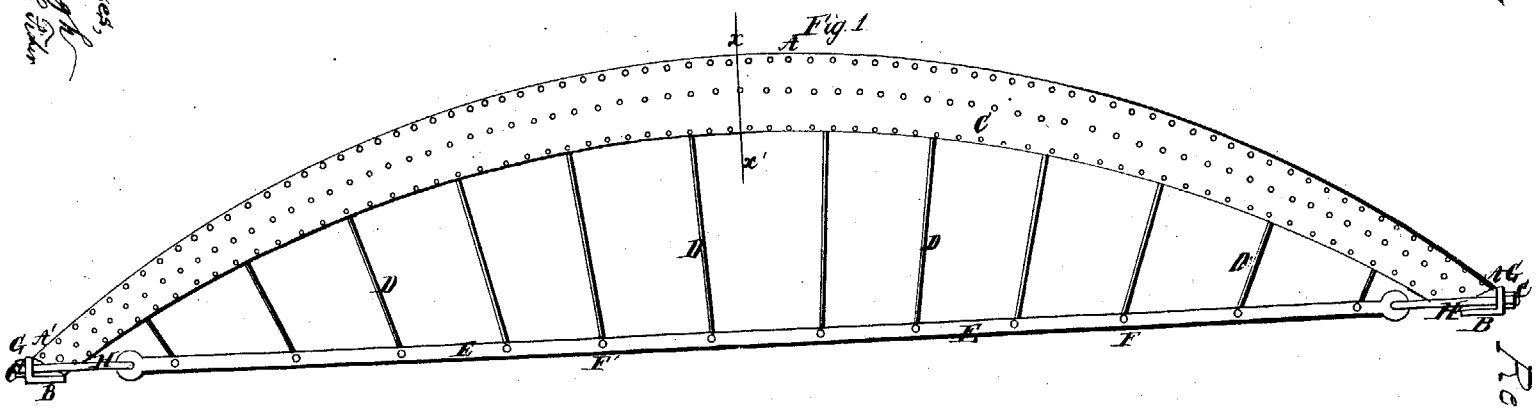
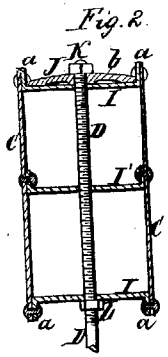
Witnesses,
Wm Clough
Charles L. Fisher
Inventors
J. King
P. M. Frees
N. PETERS, PHOTO-LITHOGRAPHER, WASHINGTON, D. C.

UNITED STATES PATENT OFFICE.

ZENAS KING, OF CLEVELAND, OHIO, FOR HIMSELF, AND ASSIGNEE OF P. M. FREES.

IMPROVEMENT IN BRIDGES.

Specification forming part of Letters Patent No. 2,380, dated October 1, 1861; reissue No. 2,707, dated July 30, 1867.

*To all whom it may concern:*

Be it known that I, ZENAS KING, of Cleveland, Cuyahoga county, Ohio, have, in connection with P. M. FREES, formerly of Cincinnati, Ohio, and assignor to said KING, invented certain Improvements in Bridges; and I do hereby declare that the following is a full and exact description thereof, reference being had to the accompanying drawings and to the letters of reference marked thereon.

This invention relates to that class of bridges which have tubular iron arches, and in which the roadway is supported by a tie-beam attached to each end or foot of the arch, and connected to said arch by iron rods passing at various points from one to the other.

These arches are constructed with a gradually-increasing sectional area from each foot toward the center or crown of the arch, so as to make the arch proportionally more resistant to deflection at all the points where an increase of deflection would naturally take place, and vice versa, diminishing the sectional area of the arch, as the deflection would naturally decrease from the ends receiving more directly, from their contiguity, the vertical support of the abutments when a weight of any kind passed over the bridge, thus making each section equally strong in proportion to the deflection which it has to resist, and thereby insuring an extremely stable structure. This increase in the sectional area of the arch is generally confined to its vertical dimensions, and does not ordinarily include its width or lateral measurement.

This improvement also relates to the channel-irons or stay-plates, so constructed and arranged in relation to an arch that the said plates form a vertical and lateral support to the bridge, the said plates being constructed with a flange or rim on one or both sides, so as to have two or more, and conforming to the spring or sweep of the arch; and, in addition, the said plates, by means of the flanges, admit of side or top plates being so secured to them that a continuity in the structure of the bridge is attained. The said plates may be so formed or bent as to be either placed on the side, top, bottom, or other parts of the arch, of any form, and without regard to the outer or inner lines of the arch being parallel.

The object of this invention is to make a bridge of the same strength with less metal than is ordinarily used, by distributing the metal in proportion to the strain it has to bear, and thus lightening the bridge; or to make a much stronger bridge, by employing the same amount of metal now employed. The importance of these advantages need not be enumerated, as they are well understood.

In the drawings, Figure 1 is a side elevation of the whole bridge. Fig. 2 is a cross-section taken through the line $x\ x'$ in Fig. 1.

The same letters of reference indicate similar parts in each.

A is the arch, extending from pier to pier, and resting on each pier in a suitable and proper bearing, as at B. This arch is constructed of two side plates, C, which are connected together by an upper and lower plate or plates, I, running the whole length of the arch, and having their edges turned at right angles, forming a flange or rim, *a*, in order to allow of their being riveted to the side plates, and so forming a hollow arched girder or chord. Between these two plates I a stay-plate, I′, of like character, is placed and riveted to the side plates C, to give rigidity and strength to the structure. These angles and rivets are seen at *a′*, Fig. 2. The angles or rims *a* may be formed on each side of the plates opposite to each other, so as to be I-shaped, making rims on each side, which would admit of additional riveting and strength to the structure. The stay-plates or channel-irons I′ may be so combined in the structure as to take the place of the side plates C, in which case plates would be secured to the rims or angles of the stay-plates, so as to form the outer and inner line of the arch. As will be seen in Fig. 1, the arch gradually increases in sectional area, vertically from the point A′, one foot of the arch, to the point X, the center or crown of the arch, and gradually diminishes in sectional area, vertically from the point X to the other foot of the arch A″. Each foot of the arch rests in a suitable step, G, to which the tie-beam E is also secured by stirrups H, which ends are threaded, and pass through holes in the back of the step on each side of the arch, where they are secured by nuts *c*. This tie-beam is constructed of two parallel plates or bars, connected by eyes or in any other suitable way. Connected to the tie-beam, by pins F, are series of iron rods, D, which pass upward to the arch above them, where they are secured in the following way: In the upper and lower plates I, which connect the side plates horizontally, and in the central stay-plate, a hole or aperture is cut large enough to admit of the radial arm D passing through it, and on the upper end of the radial rod a screw-thread is cut. Fitting in the recess formed by the top plate I and its junction with C, by means of the portion turned up at right angles to it, to be riveted to C, is a cast-iron washer or plate, J, whose under side is channeled by grooves *b*, to admit of any rain passing through over the top of the arch to the ground, which would otherwise lodge on the top, and tend to rust the bridge, and thus cause premature decay. Through this means, also, the end of the radial rod D, and on it the nut K, which secures the rod in its place, rests. By having the nut rest on this plate, the strain of the radial rod is distributed equally over all parts of the arch, which naturally belongs to it. A nut, L, is also screwed around the rod D, up to the lower horizontal plate I, to prevent any vibration of the rod, and thereby prevents the rod wearing out the holes through which it passes, and thus becoming loose.

Having described the improvement as applied to tubular arches having a rectilinear cross-section, it is, however, applicable to tubular wrought-iron arches made in other forms or structures.

Having thus described the improvement in the construction of tubular metallic bridges, what is claimed as new, and desired to be secured by Letters Patent, is—

1. The construction and arrangement of the arch when the same increases gradually in its vertical and lateral dimensions from the ends A′ A″ of the arch to its center or crown, substantially as and for the purpose set forth.

2. The construction and arrangement of the arched or curved stay-plates or channel-irons in combination with arched bridges, for the purpose specified.

ZENAS KING.

Witnesses:
W. H. BURRIDGE,
E. E. WAITE.